No. 839,659. PATENTED DEC. 25, 1906.
L. SIMS.
ANIMAL POKE.
APPLICATION FILED JUNE 20, 1906.
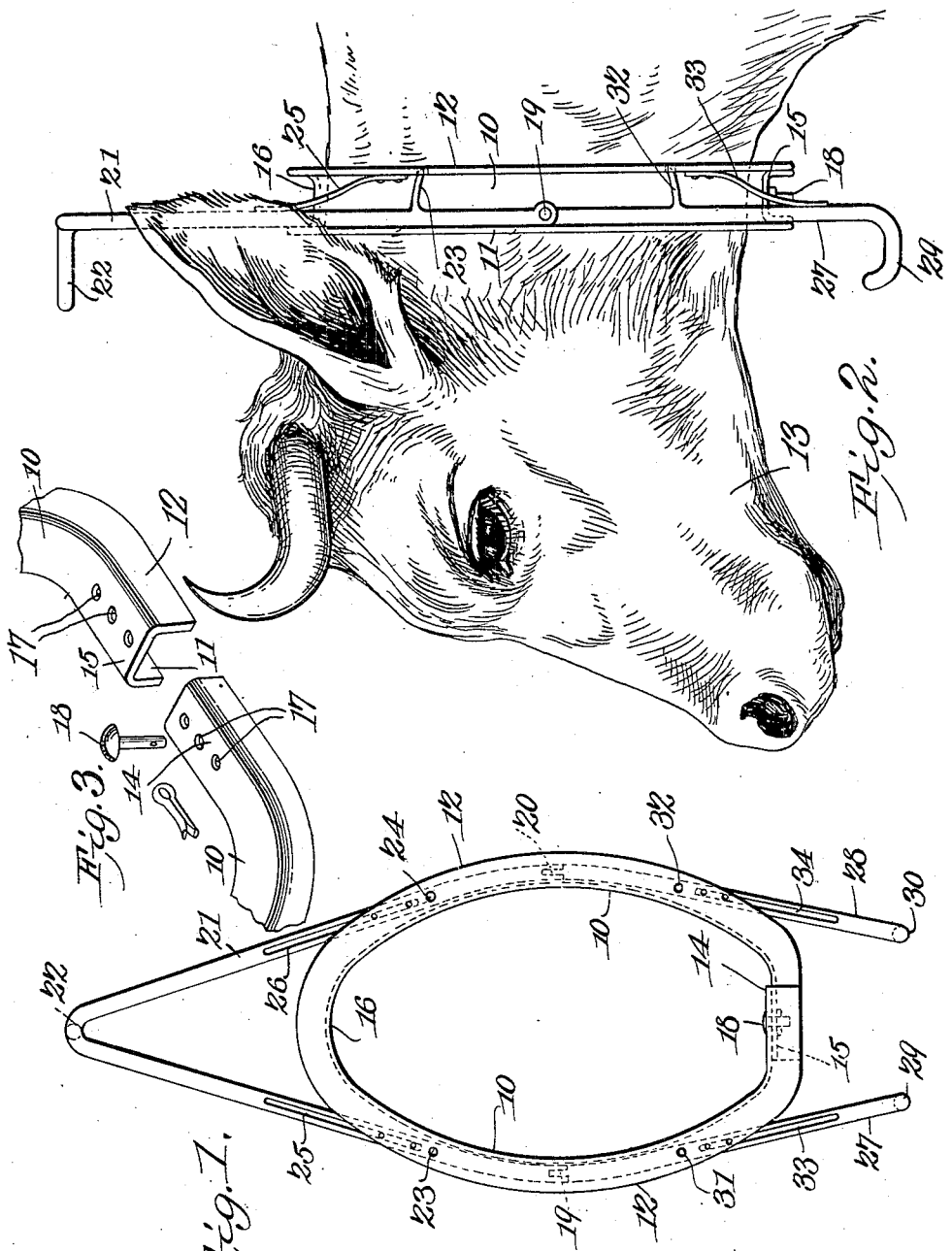
WITNESSES:
Lawrence Sims, INVENTOR.
By C.A. Snow & Co.
ATTORNEYS

UNITED STATES PATENT OFFICE.

LAWRENCE SIMS, OF BERRYTON, KANSAS.

ANIMAL-POKE.

No. 839,659.   Specification of Letters Patent.   Patented Dec. 25, 1906.

Application filed June 20, 1906. Serial No. 322,630.

*To all whom it may concern:*

Be it known that I, LAWRENCE SIMS, a citizen of the United States, residing at Berryton, in the county of Shawnee and State of Kansas, have invented a new and useful Animal-Poke, of which the following is a specification.

This invention relates to animal-pokes, and has for its object to produce a simply-constructed device of this character having means for adjusting the same to adapt it to the necks of animals of various sizes.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that various changes in the form, proportion, and minor details of construction may be resorted to without departing from the principle or sacrificing any of the advantages of this invention within the scope of the appended claims.

In the drawings, Figure 1 is a rear elevation of the improved device. Fig. 2 is a side elevation of the same applied. Fig. 3 represents the overlapping ends of the frame of the device in perspective, together with the fastening device.

The improved device comprises a neck-embracing frame, preferably constructed from a single piece of metal in channel shape or with a flat portion 10 and spaced lateral flanges 11 12, the flat portion being disposed next to the neck of the animal (indicated at 13) and with the flange 11 toward the front or head and the flange 12 toward the rear or body of the animal. The frame is bent into a substantially elliptical form with the terminals 14 15 overlapping beneath the throat and with the upper portion of said frame bearing over the upper side of the neck, as at 16. The overlapping portions 14 15 of the frame are provided with means, such as spaced apertures 17, to receive a fastening device, such as a pin 18, for adjustably coupling the overlapping terminals, and thus provide means for adapting the frame to different-sized necks. Pivoted at 19 20 on the body 10 of the frame and between the flanges 11 12 is an arched member 21, extending above the neck-frame and preferably provided with a forwardly-extending arm 22. The arched member 21 is also provided with spurs 23 24, extending rearwardly of the neck-frame and through apertures formed in the rear flange 12. Springs 25 26 are connected to the neck-frame and operate to hold the arch frame yieldably in its forward position and with the spurs 23 24 withdrawn, as represented in Fig. 2. Swinging from the neck-frame, preferably from the pivots 19 20, are arms 27 28, which extend below the frame and are preferably provided with terminal hooks 29 30. The arms 27 28 are provided with spurs 31 32, extending rearwardly through the flange 12, and the neck-frame is provided with springs 33 34, operating against the arms to maintain them yieldably in their forward positions and with the spurs 31 32 in withdrawn position.

The device thus constructed and applied to the neck of the animal and adjusted thereto by the fastening device 18, as above described, does not interfere with the feeding or other ordinary movements of the animal, the spurs being maintained in withdrawn position by the springs. In event, however, of any attempt of the animal to force its way through a fence or other inclosure or obstruction the members 21, 27, and 28 will be forced rearwardly by the contact of the same with the obstruction and cause the spurs to engage the shoulders of the animal and prompt it to retract its movements. The laterally-projecting flanges 11 12 protect the parts which are arranged to swing between them from displacement by brush, trees, or other objects with which the animal may come in contact.

Having thus described the invention, what is claimed is—

1. An animal-poke comprising a neck-embracing frame, an arched member having rearwardly-extending spurs and swinging from said frame and extending above the same, spaced bars having rearwardly-extending spurs and swinging from said frame and depending below the same, means for yieldably supporting the arched member in position, and means for yieldably supporting said bars.

2. An animal-poke comprising a neck-embracing frame closed at one end and adjustably coupled at the other end, an arched member having a forwardly-extending arm and rearwardly-extending spurs and swinging from said frame and projecting above the same, spaced bars having rearwardly-extending spurs and swinging from said frame and extending below the same, means for yieldably supporting the arched member in position, and means for yieldably supporting said bars.

3. An animal-poke comprising a neck-embracing frame formed with spaced lateral flanges, an arched member having rearwardly-extending spurs and swinging from said frame between said flanges and extending above the frame, spaced bars having rearwardly-extending spurs and swinging from said frame between said flanges and depending below the frame, means for yieldably supporting the arched member in position, and means for yieldably supporting said bars.

4. An animal-poke comprising a neck-embracing frame formed of a single piece of resilient material the adjacent ends of which are overlapped, fastening devices engaging the overlapped ends of the frame, an arched member having rearwardly-extending spurs and swinging from said frame and extending above the same, spaced bars having rearwardly-extending spurs and swinging from said frame and depending below the same, means for yieldably supporting the arched member in position, and means for yieldably supporting said bars.

5. An animal-poke comprising a neck-embracing frame formed of a single piece of resilient material and provided with spaced lateral flanges, an arched member having rearwardly-extending spurs and swinging from said frame between said flanges and extending above the frame, spaced bars having rearwardly-extending spurs and swinging from said frame between said flanges and depending below the frame, means for yieldably supporting the arched member in position and means for yieldably supporting said bars.

In testimony that I claim the foregoing as my own I have hereto affixed my signature in the presence of two witnesses.

LAWRENCE SIMS.

Witnesses:
JOSEPH P. HEIL, Jr.,
M. F. LAYCOCK.